US010053615B2

United States Patent
Offenbacher et al.

(10) Patent No.: US 10,053,615 B2
(45) Date of Patent: Aug. 21, 2018

(54) METHOD OF APPLYING SOLVENT TREATMENTS USING EMULSIONS

(71) Applicant: M-I L.L.C., Houston, TX (US)

(72) Inventors: Matthew Offenbacher, Houston, TX (US); Balkrishna Gadiyar, Katy, TX (US)

(73) Assignee: M-I L.L.C., Houston, TX (US)

( * ) Notice: Subject to any disclaimer, the term of this patent is extended or adjusted under 35 U.S.C. 154(b) by 21 days.

(21) Appl. No.: 14/901,197

(22) PCT Filed: Sep. 18, 2014

(86) PCT No.: PCT/US2014/056230
§ 371 (c)(1),
(2) Date: Dec. 28, 2015

(87) PCT Pub. No.: WO2015/047850
PCT Pub. Date: Apr. 2, 2015

(65) Prior Publication Data
US 2016/0152885 A1     Jun. 2, 2016

Related U.S. Application Data

(60) Provisional application No. 61/882,379, filed on Sep. 25, 2013.

(51) Int. Cl.
| | |
|---|---|
| *E21B 37/06* | (2006.01) |
| *C09K 8/36* | (2006.01) |
| *C09K 8/26* | (2006.01) |
| *C09K 8/57* | (2006.01) |
| *E21B 43/04* | (2006.01) |

(52) U.S. Cl.
CPC .............. *C09K 8/57* (2013.01); *C09K 8/26* (2013.01); *C09K 8/36* (2013.01); *E21B 37/06* (2013.01); *E21B 43/04* (2013.01)

(58) Field of Classification Search
CPC .............. E21B 37/06; C09K 8/36; C09K 8/26
See application file for complete search history.

(56) References Cited

U.S. PATENT DOCUMENTS

| | | | | |
|---|---|---|---|---|
| 7,267,169 | B2 * | 9/2007 | Powell | C09K 8/52 166/276 |
| 2005/0065037 | A1 | 3/2005 | Constien | |
| 2006/0223714 | A1 | 10/2006 | Svoboda et al. | |
| 2010/0319915 | A1 | 12/2010 | Bustos et al. | |
| 2011/0094754 | A1 | 4/2011 | Smart | |
| 2012/0067575 | A1 * | 3/2012 | Luyster | C09K 8/36 166/278 |

OTHER PUBLICATIONS

International Search Report and Written Opinion for the equivalent International patent application PCT/US2014/056230 dated Dec. 23, 2014.
International Preliminary Report on Patentability for the equivalent International patent application PCT/US2014/056230 dated Mar. 29, 2016.
Examination Report for the equivalent Canadian patent application 2912571 dated Dec. 2, 2016.

* cited by examiner

*Primary Examiner* — Catherine Loikith
(74) *Attorney, Agent, or Firm* — David J. Smith; Sara Hinkley

(57) ABSTRACT

Methods of delivering a low density solvent into a wellbore include combining an oleaginous solvent and a nonoleaginous fluid to form an emulsion, and injecting the emulsion into a wellbore. Other uses of low density solvent systems may include dissolving waxes and wax-containing residues in a wellbore, on downhole tools, from sand screens, or use in general cleanup operations in and outside of the wellbore.

20 Claims, No Drawings

METHOD OF APPLYING SOLVENT TREATMENTS USING EMULSIONS

This application claims the benefit of U.S. Provisional Application No. 61/882,379 filed on Sep. 25, 2013, incorporated by reference herein in its entirety.

BACKGROUND

Natural resources such as oil or gas residing in subterranean formations can be recovered by drilling a wellbore that penetrates reservoirs within a given formation. During the establishment of a wellbore, a number of fluids are delivered downhole depending on the requirements of the particular operation. Wellbore fluids may be circulated through various downhole tools emplaced within the wellbore, including drill strings, casings, coiled tubing, and the like.

When fluid bearing formations are composed of poorly consolidated sands and other granular material, there is a natural tendency for the material to move with formation fluids into the wellbore during hydrocarbon production. In such formations, problems may arise when sands and other materials compact around the receiving end of the production string and reduce the effective radius of the wellbore, decreasing well productivity. In addition, sand production in unconsolidated wellbores may also erode hardware, block tubulars, create downhole cavities, and may require intervention to separate sand from fluids before disposal at the surface. To avoid such complications, completion methods employed in sand-containing reservoirs often use measures to keep formation sand in place without restricting productivity.

Techniques for controlling sand displacement may include placement of a gravel pack to hold formation sand in place and prevent sand from entering production streams from open-hole oil and gas wells. In gravel pack operations, a steel screen may be placed in a wellbore and the surrounding annulus is packed with prepared gravel of a specific size designed to prevent the passage of formation sand while still allowing fluid to flow through the gravel, screen, and enter production piping. Gravel packing operations may generally stabilize the formation while causing minimal impairment to well productivity.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, the present disclosure discloses methods of delivering low density solvents into a wellbore that including combining an oleaginous solvent and a non-oleaginous fluid to form an emulsion, and injecting the emulsion into a wellbore.

In another aspect, the present disclosure discloses methods of installing a sand screen within a wellbore that including emplacing the sand screen within the wellbore, wherein the sand screen has a wax coating. The method may further include injecting a fluid system into the wellbore, the fluid system containing a solvent and a non-oleaginous fluid that form an emulsion, contacting the wax coating present on the sand screen with the fluid system, and allowing the fluid system to reduce the wax coating.

In yet another aspect, the present disclosure discloses methods that include injecting a fluid system into a wellbore, the fluid system comprising a solvent and a non-oleaginous fluid that form an emulsion. The method may further include contacting a wax or wax-based residue in the wellbore, and dissolving or otherwise removing the wax or wax-based residue from the wellbore.

Further aspects of the subject disclosure will become readily apparent from the following detailed description.

DETAILED DESCRIPTION

The particulars shown herein are by way of example and for purposes of illustrative discussion of the embodiments of the subject disclosure only and are presented in the cause of providing what is believed to be the most useful and readily understood description of the principles and conceptual aspects of the subject disclosure. In this regard, no attempt is made to show structural details in more detail than is necessary for the fundamental understanding of the subject disclosure. The description taken with drawings, if any, may make apparent to those skilled in the art how the several forms of the subject disclosure may be embodied in practice. For example, systems, processes, and other elements of embodiments may be shown as components in block diagram form in order not to obscure the embodiments in unnecessary detail. In other instances, well-known processes, structures, and techniques may be described without unnecessary details in order to avoid obscuring the embodiments.

The present disclosure relates to fluid systems used to deliver low density treatment fluids downhole. Specifically, the disclosure is directed to solvent systems that deliver low-density solvents as a component of an emulsified wellbore fluid. For example, in embodiments directed to invert emulsions, solvent systems may contain an oleaginous solvent external phase, a non-oleaginous internal phase, and one or more surfactants.

In particular embodiments, solvent systems in accordance with the present disclosure may be used downhole to dissolve wax-based components, e.g., wax, wax deposits, allowing such deposits to be easily pumped out when reclaiming treatment fluids. Waxes encountered downhole may include a multitude of higher-molecular-weight paraffinic components that are minutely soluble in the liquid phase of black oils and condensates, for example. As a wax-containing fluid cools, higher-molecular weight wax-based components becomes less soluble and eventually separate from surrounding fluids and begin to solidify. The onset of crystallization is known as the cloud-point, which may produce a wax-appearance. As the fluid continues to cool, lower-molecular weight species also solidify, adding to the solid fraction. Wax crystallization may be controlled by temperature but may also be dependent on fluid composition. Common wax-based components may include, for example, beeswax, paraffin wax, candelilla wax, carnuba wax, ceresine wax, montan wax, shellac wax, petrolatum waxes, and the like.

While downhole temperatures are often high enough to keep waxes in a mobile liquid phase for formations having lower temperatures, for example, wax deposits may not reach sufficient temperatures to rise above the cloud point for the particular wax and may remain solid and relatively immobile. In such formations, wax deposits may be removed using means that may include disrupting, solubilizing, or partially solubilizing the wax in a suitable solvent or displacing the wax with steam or heated oils.

While hydrocarbon solvents may be employed to reduce wax-based components, suitable solvents for dissolving the components may have densities that are much lower than other fluids present within the well and are quickly displaced from targeted intervals. Thus, in order to treat intervals at low depths, the treatment may be continuously pumped through the interval or be weighted up to reach a sufficient density to resist displacement by hydrostatic forces. In one aspect, inventors of the instant disclosure have addressed this limitation by delivering solvents downhole as a component of an invert emulsion in which fluid density is provided to the system through the incorporation of a discontinuous aqueous phase.

In particular embodiments, solvent systems of the present disclosure may be used to reduce wax and/or wax-based components present downhole, whether they be naturally occurring or introduced from previous wellbore operations. Solvent systems may be a weak emulsion or a dispersion that is unstable and separates over a period of time. Such systems may allow for easier removal of waxy deposits, which may be carried with the low density phase as it separates and rises to the top of the denser non-oleaginous phase. In some embodiments, the solvent system may be an emulsion formulated without surfactant or with low concentrations of surfactant. Such emulsions may be used, for example, to create weak emulsions that minimize the damage to the formation that may be associated with the use of particular surfactants.

In other embodiments, solvent systems of the present disclosure may be used during completions operations in wellbores that have been drilled with muds containing wax-based or wax-containing fluid loss control agents. For example, drilling fluids and residues formulated with waxes as seepage control agents or present as additive coatings may be dissolved and removed with an invert emulsion solvent system in accordance with the present disclosure prior to production operations.

In another embodiment, fluid systems in accordance with the instant disclosure may be used to remove waxes or other deposits from the surface of a sand screen emplaced downhole. Sand screens are mechanical devices used to separate entrained sand from wellbore fluids below the surface, thereby preventing solids from entering the producing well. Sand screens are often employed alone to screen out sand in various operations or may be used in conjunction with gravel pack completions. For example, protected sand screens may be installed in a selected interval and, once emplaced, the wellbore may be gravel packed by known methods including water packing or slurry packing methods prior to removal of the coating from the sand screen.

In either operation, the screen is provided with particularly sized openings to encourage sand grains to bridge. In completions which employ a screen without aggregate, the screen openings are sized in relation to formation particles to effect particle bridging. In gravel pack completions, the screen openings are sized in relation to the aggregate used outside the screen, and the aggregate is sized in relation to formation sand. The size relationships of the aggregate and/or screen are normally determined by well-known techniques which are based upon sieve analysis data obtained from formation cores.

However, the small openings in such screens may present challenges during storage, handling, and placement because of the tendency of the openings to become plugged with particulates. For example, many completion fluids or materials containing fluid loss additives can reduce the flow capacity of screens because of the propensity of such fluids to form filter cakes or seals on the surface of screens. Another factor that may contribute to poor screen performance is the plugging effects of corrosion during storage and handling. During storage prior to use, corrosion products formed on screens such as iron oxide can build up and seriously restrict the flow area of openings in the screen's fine mesh. Corrosion is particularly severe in offshore environments where exposure to the salty air can produce substantial corrosion in a matter of days. Further, prior to being run in the well, the screen is normally delivered to the well site and laid on the ground or on the pipe rack where dirt, grease or other foreign matter can become lodged in the openings. Regardless of the source of the foreign material which plugs the screen openings, it can be difficult to remove such materials from fine mesh screens, particularly once emplaced downhole.

In order to decrease the possibility of detrimental screen damage prior to emplacement, coatings are often applied to screen openings prior to transport or installation downhole. The coatings may be heat-sensitive and transition to a liquid or semi-liquid at temperatures existing at the setting depth of the screen. Because of its low cost, availability, ease of application, and low melting point, waxes are often chosen as a temporary sealant.

In particular embodiments, solvent systems in accordance with the instant disclosure may be used to clean and remove waxes from sand control screens that have been temporarily plugged with wax prior to installation into a wellbore that has an average zonal temperature below the melting temperature and/or cloud point of the wax.

In yet other embodiments, the screen may use a thermoplastic resin as the protective coating and sealant such as polyethylene and polypropylene. When such polymeric coatings are employed, compatible solvents may be selected from those disclosed and used to formulate an appropriate solvent system.

Further, in other embodiments, where the well naturally contains paraffins and other wax-based components that may accumulate on sand screens, other equipment, or is present in the wellbore generally, the solvent delivery systems of the present disclosure may be employed as a chemical treatment to remove insoluble deposits from screens or equipment emplaced downhole or present in the wellbore in order to increase or restore production.

Thus, one or more embodiments are directed to the treatment of sand control screens temporarily plugged with wax that are installed in deep open hole wells, wherein the wax has a melting temperature slightly greater or less than the nominal formation temperature in the zone from which well fluids are to be produced. Drilling fluids and other solids-laden wellbore fluids are displaced from the wellbore by flowing the fluids up through a section of tubing disposed distal to the screen, through the interior of the screen and through the tubing string to the surface until the wellbore is cleaned of the solids laden fluid. The solvent system of the present disclosure is introduced to the screen to reduce the wax-based component. The wax-based component may be reduced such as by softening, eroding, removing, dissolving (partially or completely), etc. The distal tubing section is then plugged so that production fluids are forced to flow through the sand control screen in a conventional manner. In other embodiments, one or more displacement and/or completion fluids may be used in conjunction with the solvent systems of the present disclosure.

Solvent Delivery Systems

Solvent delivery systems of the instant disclosure may be compatible with a number of low density solvents. Fluid systems in accordance with embodiments of the present disclosure may contain a mixture of a solvent, an aqueous fluid, and a surfactant. In particular embodiments, the surfactant may be selected such that the emulsion formed is a dispersion or a weak or unstable emulsion. In the application of embodiments that utilize weak emulsions, the emulsion may be prepared at the surface and injected into the formation to maximize the time that the disparate phases will remain comingled. After a period of time that may vary based upon the selected surfactant and other factors such as pH, temperature, and the presence of fluids downhole, the emulsions may degrade and phase separate, displacing the low density solvent phase above the targeted region. The low density solvent may then form an upper oleaginous phase, along with any solubilized wax or residues. In particular embodiments, a weak emulsion may be prepared at the surface and injected into the well to contact a wax or wax-based residue in an open or cased interval of the wellbore, and upon dissolution of the wax or residue, the emulsion separates and lifts any wax or residues from the treated interval.

In one or more embodiments, the solvent may be the continuous phase of an invert emulsion and be present at a percent by volume (vol %) of 30 vol % to 90 vol % in some embodiments, or 30 vol % to 75 vol % in other embodiments.

In one or more embodiments, the density of the solvent systems in accordance with the present disclosure may range in density selected from a lower limit of about 8 ppg, 9 ppg, and 10 ppg to an upper limit of about 11 ppg, 12 ppg, and 13 ppg.

In particular embodiments, the solvents in accordance with the present disclosure may include hydrocarbon solvents such as terpenes, such as d-limonene, turpentine, pinene, and citronellol, terpenoids, kerosene, pentane, hexane, heptane, decane, xylene, and other C2-C16 hydrocarbon solvents, for example. In yet other embodiments, the solvent may be one selected from glycol ethers such as those formed from C1-C6 alcohols and C2-12 glycols including, but not limited to, dipropylene glycol methyl ether, hexylene glycol methyl ether, ethylene glycol monobutyl ether, and triethylene glycol monobutyl ether. In other embodiments, suitable solvents may include esters of aliphatic C2-5 carboxylic acids and C4-C22 alcohols or polyols such as, for example, methyl laurate, ethyl laurate, methyl myristate, ethyl myristate, butyl lactate, ethyl lactate, isopropyl lactate, isopropyl palmitate, propylene carbonate, and butylene carbonate. In other embodiments, the solvent may be selected from alkyl amide solvents that include C8-14 alkyl amides and C8-14 dialkyl amides such as, for example, N,N-dimethyloctanamide and N,N-dimethyldecanamide, or selected from alkyl mono- or di-ethanolamides such as lauryl monoethanolamide or myristyl monoethanolamide, for example. In particular embodiments, the solvent may be selected from low density commercial solvents such as DEEPCLEAN™, SAFE-SOLV™ OM, and SAFE-T-PICKLE™, which are available from M-I L.L.C. (Houston, Tex.). In one or more embodiments, the solvent may be immiscible or substantially immiscible with water. For substantially immiscible solvents, the solvent may be miscible with water at 25° C. at a percent by volume (vol %) that ranges from a lower limit selected from the group of 0 vol %, $1\times10^{-7}$ vol %, $1\times10^{-5}$ vol %, $1\times10^{-4}$ vol %, and 1 vol % to an upper limit selected from the group of 0.1 vol %, 1 vol %, 5 vol %, 10 vol %, and 20 vol %.

In one or more embodiments, the solvent may be a semi-volatile solvent having a vapor pressure at 20° C. within the range of $1\times10^{-7}$ mmHg to 1 mmHg.

Solvent systems in accordance with the instant disclosure may be formulated as an invert emulsion containing a non-oleaginous or aqueous solvent internal phase having an equivalent or greater density than the solvent external phase. The non-oleaginous fluid may be selected from the group including one or more of fresh water, sea water, a brine containing organic and/or inorganic dissolved salts, liquids containing water-miscible organic compounds, and combinations thereof. For example, the aqueous fluid may be formulated with mixtures of desired salts in fresh water. Such salts may include, but are not limited to alkali metal chlorides, hydroxides, or carboxylates, for example.

In various embodiments of the solvent system disclosed herein, the non-oleaginous fluid may include seawater, aqueous solutions wherein the salt concentration is less than that of sea water, or aqueous solutions wherein the salt concentration is greater than that of sea water. Salts that may be found in seawater include, but are not limited to, sodium, calcium, aluminum, magnesium, potassium, strontium, and lithium, salts of chlorides, bromides, carbonates, iodides, chlorates, bromates, formates, nitrates, oxides, phosphates, sulfates, silicates, and fluorides. Salts that may be incorporated in a given brine include any one or more of those present in natural seawater or any other organic or inorganic dissolved salts. Additionally, brines that may be used in the drilling fluids disclosed herein may be natural or synthetic, with synthetic brines tending to be much simpler in constitution. In one embodiment, the density of the drilling fluid may be controlled by increasing the salt concentration in the brine (up to saturation). In a particular embodiment, a brine may include halide or carboxylate salts of mono- or di-valent cations of metals, such as cesium, potassium, calcium, zinc, and/or sodium.

In particular embodiments disclosed herein, the solvent system may be an invert emulsion fluid having an oil/water ratio of less than 55/45, which may also be referred to as high internal phase ratio (HIPR) invert emulsions or high internal phase emulsions (HIPE). For example, in one or more embodiments, the amount of non-oleaginous fluid may be less than about 70% by volume of the solvent system or from about 1% to about 70% by volume of the solvent system in other embodiments. In other embodiments, the non-oleaginous fluid may be from about 5% to about 60% by volume of the fluid system.

Surfactants

Solvent systems of the instant disclosure may include a surfactant capable of generating an invert emulsion, also known in the art as a water-in-oil emulsion. Surfactants that may be used in the systems disclosed herein include, for example, fatty acids, amidoamines, polyamides, polyamines, oleate esters, such as sorbitan monoleate, sorbitan dioleate, imidazoline derivatives or alcohol derivatives and combinations or derivatives of the above.

In one or more embodiments, the surfactant may be selected by choosing a surfactant having a suitable hydrophilic lipophilic balance to generate a stable, or weakly stabilized, invert emulsion. The term "HLB" (Hydrophilic Lipophilic Balance) refers to the ratio of the hydrophilicity of the polar groups of the surface-active molecules to the hydrophobicity of the lipophilic portion(s) of the same molecules. A HLB value may be calculated by considering the molecular weight contributions of the respective hydrophilic and lipophilic portions and taking the ratio thereof (divided by 5). A HLB value of 0 corresponds to a completely lipophilic/hydrophobic molecule, and a value of 20 corresponds to a completely hydrophilic/lipophobic molecule.

Generally, the Bancroft rule applies to the behavior of emulsions: emulsifiers and emulsifying particles tend to promote dispersion of the phase in which they do not dissolve very well. For example, a compound that dissolves better in water than in oil tends to form oil-in-water emulsions (i.e., they promote the dispersion of oil droplets throughout a continuous phase of water). Emulsifiers are typically amphiphilic. That is, they possess both a hydrophilic portion and a hydrophobic portion. The chemistry and strength of the hydrophilic polar group compared with those of the lipophilic nonpolar group determine whether the emulsion forms as an oil-in-water or water-in-oil emulsion. In particular, emulsifiers may be evaluated based on their HLB value. To form an invert emulsion, an emulsifier (or a mixture of emulsifiers) having a low HLB may be desirable.

In one or more embodiments, surfactants of the present disclosure may have an HLB of less than 3, between 3 and 12 in other embodiments, and between 3 and 7 in still other embodiments.

In one or more embodiments, the stability of emulsions formed by solvent systems in accordance with the present disclosure may be characterized using electrical stability measurements. Electrical Stability (ES) measurements give an indication of the stability of a water-in-oil emulsion. In order to characterize the stability of a water-in-oil emulsion, a strong electric field is applied across a small gap between two electrodes. Normally, alternating current (AC) electrical fields are applied to mitigate damage to the surfaces of the electrodes. The gap is filled with a sample of the fluid to be tested. The electric field is increased until a relatively significant current flows through the sample between the electrodes. Oil based drilling fluids with emulsified brine are essentially electrical insulators to weak electric fields. As the field strength increases, the emulsified droplets of water in the electrode gap begin to elongate and align with the electric field. If the electric field is sufficiently strong, the droplets may eventually merge, forming a conductive bridge across the electrode gap. The droplet bridge can conduct a relatively significant electric current. The moment that the current exceeds a specified trip current is described as breakdown.

As discussed above, embodiments of the solvent system include weak emulsions that may remain stable long enough to deliver the solvent system to the appropriate depth within a wellbore in order to contact a wax or other residue before collapsing over time and separating into distinct phases. In one or more embodiments, the solvent system may be formulated to create an emulsion having an electrical stability within a range having a lower limit selected from the group of 5 V, 10 V, 20 V, 30 V, and 40 V to an upper limit selected from the group of 30 V, 50 V, 60 V, 75 V, and 100V.

In one or more embodiments, the surfactant may include fatty acids having the general formula $XR^1R^2$, where X may be a counter ion such as an alkaline or alkali metal, ammonium, or be a covalent hydrogen; $R^1$ is an acidic functional group capable of forming an anion such as a carboxylic acid or a sulfate group, and $R^2$ is an alkyl group having 3-22 carbon atoms. In one or more embodiments, the surfactant may be a fatty acid including fatty acids derived from animal and vegetable fats and oils. Fatty acids are the raw materials used in the manufacture of many drilling-fluid additives, such as emulsifiers, oil-wetting agents and lubricants. For example, Tall-oil fatty acids are distilled from conifer trees. Animal and vegetable fats and oils are triglycerides, which are hydrolyzed to give fatty acids (and glycerol). Fatty acids from animals are mostly saturated acids, having single bonds between carbon atoms. Tall oils and vegetable oils yield both saturated and unsaturated (double- and triple-bond) fatty acids.

For example, the surfactant may be a fatty acid selected from such as butyric acid, valeric acid, caproic acid, enanthic acid, caprylic acid, pelargonic acid, capric acid, lauric acid, mysristic acid, palmitic acid, stearic acid, in addition to unsaturated fatty acids such as myristoleic acid, palmitoleic acid, oleic acid, linoleic acid, alpha-linoleic acid, erucic acid, and the like. In addition to these fatty acids, the compounds may also have a small degree of substitution/branching or may be sulfonic or phosphonic derivatives thereof.

Other surfactants may include amidoamines such as those represented by:

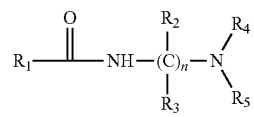

wherein $R_1$ is selected from a $C_{12}$-$C_{30}$ alkyl, $C_{12}$-$C_{30}$ alkenyl, $C_{12}$-$C_{30}$ arylalkyl, and $C_{12}$-$C_{30}$ cycloalkyl; $R_2$ and $R_3$ are each independently selected from H or a $C_1$-$C_4$ alkyl; $R_4$ and $R_5$ are each independently selected from H, $C_1$-$C_4$ alkyl, $C_1$-$C_4$ alkoxyalkyl, and $C_1$-$C_4$ hydroxyalkyl; and n is an integer from 1 to 10. Amidoamines may be formed from the reaction of a polyamine with a carboxylic acid. For example, in a particular embodiment, an amidoamine formed from a $C_6$-$C_{22}$ fatty acid reacted with a polyamine. In a particular embodiment, the organophilic reactive amine may include a $C_{12}$-$C_{22}$ fatty acid reacted with a polyalkylene polyamine. Alternatively, the organophilic reactive amine may include 2-alkyl imidazoline formed from $C_{12}$-$C_{22}$ fatty acid reacted with a polyalkylene polyamine, which may then be derivatized with a dicarboxylic acid.

In other embodiment, the surfactant may be selected from $C_6$-$C_{36}$ fatty polyamines including polyaliphatic polyamines, heterocyclic polyamines, and alkylalkanol polyamines. In one embodiment, organophilic reactive polyamines may have at least one amine being a reactive amine. Alternatively, an organophilic species comprising a tertiary amine may be reacted with quebracho.

Additionally, the fluid may also contain surfactants that may be characterized as wetting agents. Wetting agents that may be suitable for use in the fluids disclosed herein include crude tall oil, oxidized crude tall oil, organic phosphate esters, modified imidazolines and amidoamines, alkyl aromatic sulfates and sulfonates such as dodecylbenzyl sulfonic acid, and the like, and combinations or derivatives of these. Examples of commercially available surfactants suitable for use in the solvent systems disclosed herein include FAZEMUL™, FAZE-WET™, VERSACOAT™, NOVAWET™, SUREMUL™ PLUS, SUREMUL™, SUREMUL™ EH, SUREWET™, VERSAWET™, and VERSA WET™ NS, all of which are manufactured and distributed by M-I L.L.C. of Houston, Tex.

In one or more embodiments, at least one surfactant may be added at 1 to 6 lb/bbl in some embodiments, and from 2 to 4 lb/bbl in other embodiments.

In yet other embodiments, the emulsion may be a stable emulsion that destabilizes or separates upon a change in the ionization state of the emulsifier in response to a change in pH. In a particular embodiment, the invert emulsion may be reversible, whereby the invert emulsion may be converted from a water-in-oil type emulsion to an oil-in-water type emulsion upon exposure to acid, for example.

For example, an invert emulsion may be admixed with an acid that protonates the amine surfactant. When sufficient quantities of the acid are utilized, the invert emulsion of the present disclosure may be converted so that the oleaginous fluid becomes the discontinuous phase and the non-oleaginous fluid becomes the continuous phase. The conversion of the phases is reversible so that upon addition of a base to deprotonate the protonated amine surfactant, a stable invert emulsion in which the oleaginous liquid becomes the continuous phase and the non-oleaginous fluid become the discontinuous phase can be formed.

Additionally, lime or other alkaline materials may be added to the solvent system of the present disclosure to maintain a reserve alkalinity. The reserve alkalinity may help maintain the stability of the emulsion. Absent an alkaline reserve, acidic materials encountered downhole may weaken the stability of the emulsion fluids to the point that the continuous oleaginous phase and the discontinuous non-oleaginous phase "flip." Additionally, the reserve alkalinity may also serve to aid in solubilization and/or degradation of the degradable materials described above. In a particular embodiment, lime (or other suitable alkaline materials) may be added such that the non-oleaginous phase may have an equivalent pH of at least 8.3, or greater than 10 or 11 in other embodiments.

In other embodiments that utilize pH-control to destabilize the emulsion, delayed acid sources may be used to control the period of time that the solvent system may stay in contact with a treated interval. Delayed acid sources, as referred to herein, may include compounds which will release acid upon hydrolysis or spontaneous degradation after a determined length of time. In particular, compounds that hydrolyze to form acids in situ may be utilized as a delayed acid source. Such delayed source of acidity may be provided, for example, by hydrolysis of an ester. Illustrative examples of such delayed acid sources include hydrolyzable anhydrides of carboxylic acids, hydrolyzable esters of carboxylic acids; hydrolyzable esters of phosphonic acid, hydrolyzable esters of sulfonic acid and other similar hydrolyzable compounds that should be well known to those skilled in the art.

Suitable esters may include carboxylic acid esters so that the time to achieve hydrolysis is predetermined on the known downhole conditions, such as temperature and pH. In particular embodiments, the delayed acid source may include a formic or acetic acid ester of a C2-C30 alcohol, which may be mono- or polyhydric, such as ethylene glycol monoformate or diformate. In embodiments, the delayed acid source may be the hydrolysable ester D-STRUCTOR™ available from M-I L.L.C. (Houston, Tex.).

Wellbore Fluid Additives

Other additives that may be included in the wellbore fluids disclosed herein include, for example, wetting agents, organophilic clays, viscosifiers, fluid loss control agents, surfactants, dispersants, interfacial tension reducers, pH buffers, mutual solvents, thinners, thinning agents, and cleaning agents. The addition of such agents should be well known to one of ordinary skill in the art of formulating wellbore fluids and muds.

In some embodiments, additives may be included in the composition to modify rheological properties, such as viscosity and flow. For example, organic thixotropes suitable for addition to wellbore fluids of the present disclosure may include alkyl diamides, such as those having a general formula: R1-HN—CO—(CH$_2$)$_n$—CO—NH—R2, wherein n is an integer from 1 to 20, from 1 to 4, or from 1 to 2, and R1 is an alkyl groups having from 1 to 20 carbons, from 4 to 12 carbons, or 5 to 8 carbons, and R2 is hydrogen or an alkyl group having from 1 to 20 carbons, or is hydrogen or an alkyl group having from 1 to 4 carbons, wherein R1 and R2 may or may not be identical. Such alkyl diamides may be obtained, for example, from M-I L.L.C. (Houston, Tex.) under the trade name of VERSAPAC™. Such alkyl diamide viscosifiers may be particularly suitable for use in an oil-containing wellbore fluid substantially free of an aqueous or non-oleaginous fluid, but may also be included in direct emulsions.

Viscosifiers may also be included in the wellbore fluid to viscosify the non-oleaginous internal phase. Viscosifiers which may be included are water- or brine-soluble or dispersible viscosifiers including both polymeric and clay-based viscosifiers. The polymeric viscosifiers may include synthetic polymers and/or biopolymers such as hydroxyethylcellulose (HEC), carboxymethyl cellulose, guar gum, xanthan gum diutan, scleroglucan gum and wellan gum, starches, polyamide resin, polyacrylates, polyacrylamides, and mixtures and derivatives thereof. In a particular embodiment, the biopolymer may be BIOVIS® manufactured and distributed by M-I L.L.C (Houston, Tex.). Clay-based viscosifiers which may be used comprise clay materials containing attapulgite or sepiolite clays. The amount of viscosifier used in the composition may vary upon the end use of the composition, but may range from 0.1 to 10 wt %, or from 0.2 to 6 wt %, or from 0.5 to 1.5 wt % in other embodiments.

In other embodiments, organophilic clays, such as amine treated clays, may be useful as viscosifiers in the fluid composition of the present disclosure. TRUVIS, VG-SUPREME, VG-69™ and VG-PLUS™ are organoclay materials, available from M-I L.L.C., Houston, Tex., that may be used in embodiments disclosed herein. Such organophilic clays, as well as water-based clays, may be particularly useful in assisting in the formation and stabilization of emulsions.

Other viscosifiers that may be used include partially hydrolyzed polyacrylamide (PHPA), biopolymers (such as guar gum, starch, xanthan gum and the like), bentonite, attapulgite, sepiolite, polyamide resins, polyanionic carboxymethylcellulose (PAC or CMC), polyacrylates, lignosulfonates, as well as other water soluble polymers. When formulating a direct emulsion without an emulsifier, surfactant, etc., the viscosifier may be incorporated to increase the viscosity and thus miscibility of the two phases, such that a direct (oil-in-water) emulsion is formed upon mixing in a high shear mixer, as that term is understood by those of ordinary skill in the art, operating at least 3500 rpm, or at least 5000 or 7000 rpm in other embodiments.

In other embodiments, precipitated silica may be used as a viscosifying agent. In yet other embodiments, precipitated silicas may advantageously be used to provide both weighting and viscosifying of the oleaginous base fluid. When used to provide weighting and viscosifying, the precipitated silicas may be used in addition to or in place of the weighting agents described above. Alternatively, the relative amounts of the weighting agent and the precipitated silica in the wellbore fluid formulation may be adjusted such that the wellbore fluid has both the desired density and flow properties.

EXAMPLES

Example 1

Several chemicals were tested to establish wax removal, first by soaking wax samples in different additives. Wax samples assayed were formed from MICROSERE 5000 series waxes obtained from The International Group, Inc. (Toronto Canada). SAFE-SOLV™ OM and SAFE-T-PICKLE™ were each placed in jars along with a wedge of wax sample. A third sample, ECF-1989, an ethoxylated quaternary ammonium chloride, available from M-I L.L.C. (Houston, Tex.) was added to a third container at 50% v/v with calcium chloride. The samples were left at ambient temperature to soak and observations were made a regular intervals.

SAFE-T-PICKLE™ and SAFE-SOLV™ OM performed quite similarly. The wax appeared to "fluff" and soften, and was converted into a flowing material as would be desired in a wax removal application. After 24 hours, wax submerged in SAFE-T-PICKLE and SAFE-SOLV™ OM samples broke into small, soft pieces without agitation. The ECF-1989 did not change in appearance throughout the test.

Example 2

In the next example, emulsions were formulated from a brine and one of the SAFE-SOLV™ OM or SAFE-T-PICKLE™ solvents in order to increase the density of the fluid system. Both SAFE-SOLV™ OM and SAFE-T-PICKLE™ have a specific gravity below 1 and are immiscible in non-oleaginous fluids. Because the fluids may be equal to or heavier than the resident fluid in the wellbore in order for the fluid system to remain in place once injected downhole, samples were prepared be mixing the solvents, respectively, with a brine to increase the density of the fluid system.

Initial formulations separated too rapidly to effectively treat the wax. To delay the separation, the viscosifier SAFE-VIS E, a hydroxyethylcellulose polymer in a synthetic carrier available from M-I L.L.C., was added to stabilize the emulsion. The separation also only took several minutes, so FLO-VIS™ PLUS viscosifier was tested with similar results.

Another invert emulsion containing a SAFE-SOLV™ OM continuous phase was formulated with brine and VERSAWET™, an organic oil-wetting surfactant from M-I L.L.C. (Houston, Tex.), to stabilize the weighted brine internal phase. The inclusion of the brine internal phase increases the overall density of the fluid and minimizes compatibility issues as the invert emulsion is designed to break. The oil to water ratio of the fluid system was 53:47 using ~10.75 lb/gal calcium chloride brine for the brine phase. The emulsion stability (ES) was 13 volts.

The initial formulation was prepared as shown below in Table 1 and a sample of wax was added. The wax demonstrated the softening as observed with undiluted SAFE-SOLV OM.

TABLE 1

Sample formulation for Example 2.

| Product | Concentration |
| --- | --- |
| SAFE-SOLV OM | 0.48 bbl |
| VG-SUPREME | 3 lb/bbl |
| VERSAWET | 5 lb/bbl |
| SUREMUL | 2 lb/bbl |
| Lime | 2 lb/bbl |
| 10.74 lb/gal Calcium Chloride Brine | 0.043 bbl |

Example 3

In the next example, a follow up test was performed using a sand control screen coupon soaked in wax and a full sized wax pellet. The wax demonstrated the same softening effect as observed when exposed to the "neat" SAFE-SOLV™ OM solvent. After 72 hours at ambient temperature, the wax was extremely soft and pliable and there was a clear oil separation generated from the breaking of the weak emulsion.

The preceding description has been described herein with reference to particular means, materials, and embodiments, it is not intended to be limited to the particulars disclosed herein; rather, it extends to all functionally equivalent structures, methods and uses, such as are within the scope of the appended claims. Although a few example embodiments have been described in detail above, those skilled in the art will readily appreciate that many modifications are possible in the example embodiments without materially departing from this disclosure. Accordingly, all such modifications are intended to be included within the scope of this disclosure as defined in the following claims. Moreover, embodiments disclosed herein may be practiced in the absence of any element which is not specifically disclosed.

What is claimed:

1. A method of installing a sand screen within a wellbore, the method comprising:
    emplacing the sand screen with a wax-based component within the wellbore;
    injecting a fluid system into the wellbore, the fluid system comprising a solvent and a non-oleaginous fluid that form an emulsion having an electrical stability (ES) within a range of 10 to 100 Volts;
    contacting the wax-based component with the fluid system; and
    allowing the fluid system to reduce the wax-based component.

2. The method of claim 1, wherein the solvent comprises at least one selected from a group consisting of terpenes, limonene, and ethylene glycols.

3. The method of claim 1, wherein the emulsion has an ES within the range of 20 V to 40 V.

4. The method of claim 1, wherein the emulsion further comprises a surfactant having a hydrophilic/lipophilic balance within the range of 3 to 12.

5. The method of claim 1, wherein the solvent has a vapor pressure at 20° C. within the range of $1\times10^{-7}$ mmHg to 1 mmHg.

6. The method of claim 1, further comprising pumping the fluid system through the wellbore, thereby removing the wax-based component from the screen.

7. A method comprising:
    injecting a fluid system into a wellbore, the fluid system comprising a solvent and a non-oleaginous fluid that form an emulsion having an electrical stability (ES) within a range of 10 to 100 Volts;

contacting a wax-based component in a targeted region of the wellbore with the fluid system; and reducing the wax-based component from the wellbore comprising solubilizing the wax-based component in the solvent, allowing the emulsion to phase separate into a non-oleaginous phase and a low density solvent phase comprising the solubilized wax-based component, and displacing the low density solvent phase above the targeted region.

8. The method of claim 7, wherein the solvent comprises at least one selected from a group consisting of terpenes, limonene, and ethylene glycols.

9. The method of claim 7, wherein the wax-based component is present on a surface of a sand screen.

10. The method of claim 7, wherein the wax-based component is present as a filtercake on at least an interval of the wellbore.

11. The method of claim 7, wherein the emulsion has an ES within the range of 20 V to 40 V.

12. The method of claim 7, wherein the solvent has a vapor pressure at 20° C. within the range of $1 \times 10^{-7}$ mmHg to 1 mmHg.

13. A method of delivering a low density solvent into a wellbore, the method comprising:

combining an oleaginous solvent and a non-oleaginous fluid to form an emulsion, wherein the emulsion has an electrical stability (ES) within a range of 10 to 50 Volts;

injecting the emulsion into a wellbore;

solubilizing a wax-based component in the solvent;

allowing the emulsion to phase separate into a non-oleaginous phase and a low density solvent phase comprising the solubilized wax-based component; and displacing the low density solvent phase above the targeted region.

14. The method of claim 13, wherein the solvent comprises at least one selected from a group consisting of terpenes, limonene, and ethylene glycols.

15. The method of claim 13, further comprising adding an acid or base to disrupt the emulsion.

16. The method of claim 15, wherein the emulsion contains a delayed acid source.

17. The method of claim 16, wherein the delayed acid source is a formic acid ester or an acetic acid ester of a C2-C30 alcohol.

18. The method of claim 13, wherein the density of the emulsion is from about 9 ppg to 12 ppg.

19. The method of claim 13, wherein the emulsion further comprises a surfactant that is at least one selected from a group consisting of fatty acids, amidoamines, polyamides, polyamines, and oleate esters.

20. The method of claim 19, wherein the surfactant has a hydrophilic/lipophilic balance within the range of 3 to 12.

* * * * *